ELECTRICAL INDICATING MEANS FOR TAPE RECORDING MACHINES

Filed Nov. 16, 1961 7 Sheets-Sheet 1

INVENTOR
BARTON A. PROCTOR
BY
Nolte & Nolte
ATTORNEYS

ELECTRICAL INDICATING MEANS FOR TAPE RECORDING MACHINES

Filed Nov. 16, 1961 7 Sheets-Sheet 2

INVENTOR
BARTON A. PROCTOR
BY Nolte & Nolte
ATTORNEYS

ELECTRICAL INDICATING MEANS FOR TAPE RECORDING MACHINES

Filed Nov. 16, 1961 7 Sheets-Sheet 3

INVENTOR
BARTON A. PROCTOR
BY
Nolte & Nolte
ATTORNEYS

ELECTRICAL INDICATING MEANS FOR TAPE RECORDING MACHINES

Filed Nov. 16, 1961 7 Sheets-Sheet 4

INVENTOR
BARTON A. PROCTOR
BY
Nolte & Nolte
ATTORNEYS

March 29, 1966 B. A. PROCTOR 3,243,189

ELECTRICAL INDICATING MEANS FOR TAPE RECORDING MACHINES

Filed Nov. 16, 1961 7 Sheets-Sheet 5

INVENTOR
BARTON A. PROCTOR
BY
Nolte & Nolte
ATTORNEYS

ELECTRICAL INDICATING MEANS FOR TAPE RECORDING MACHINES

Filed Nov. 16, 1961 7 Sheets-Sheet 6

INVENTOR
BARTON A. PROCTOR
BY
Nolte & Nolte
ATTORNEYS

ELECTRICAL INDICATING MEANS FOR TAPE RECORDING MACHINES

Filed Nov. 16, 1961 7 Sheets-Sheet 7

INVENTOR
BARTON A. PROCTOR
BY Nolte & Nolte
ATTORNEYS

United States Patent Office 3,243,189
Patented Mar. 29, 1966

3,243,189
ELECTRICAL INDICATING MEANS FOR TAPE RECORDING MACHINES

Barton A. Proctor, Larchmont, N.Y., assignor of thirty-three and one-third percent to Albert C. Nolte, New York, N.Y.

Filed Nov. 16, 1961, Ser. No. 153,268
13 Claims. (Cl. 274—17)

This invention relates to recording machines and more particularly to that type of machine in which information is recorded on a belt or the like on a helical path.

As is well known, a recording head may be adapted to magnetize material on a belt in accordance with signals transmitted thereto. For this purpose, the transducer follows a helical path over the surface of the belt, the belt being rotated and the head beiing transported in the direction of the axis of rotation. There is no difficulty in making such a record but there is difficulty in playing back the record so that the reproducing head will follow the path of the recording head. By the nature of the system there is no groove to follow or any mechanical deformation which will guide the head. Furthermore, the path is of such narrow width that it is difficult to properly center the reproducing head to give good reproduction.

Usually the transducers are transported on a feed screw so that in order to cause the head to return to its starting point, it is merely necessary to disconnect it from the feed screw and push the transport carriage back to the starting point which is the beginning of the feed screw. The chief difficulty is to position the record or belt so that the start of the path recorded thereon is properly situated with respect to the heads, i.e., so that the reproducing head is centered directly over the information path.

It is accordingly an object of this invention to provide a relatively simple machine for permitting a transducer to be accurately positioned with respect to a recording belt so that its subsequent positioning with respect to the recording or transmitting head can be reproduced accurately and without trial and error.

Other objects of the invention will be in part obvious and in part pointed out hereinafter.

Figure 1:
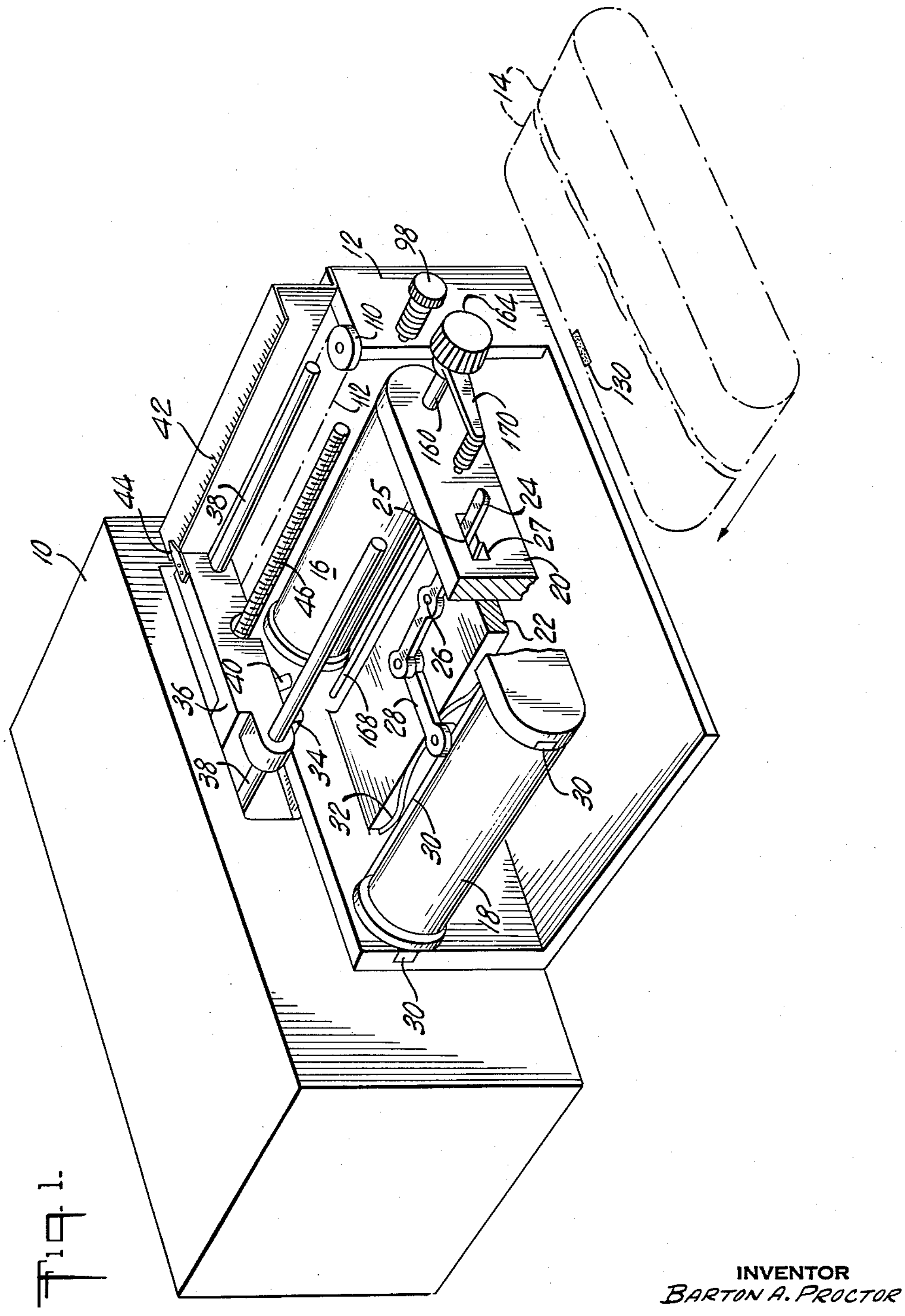
Figures 2, 9, 10:
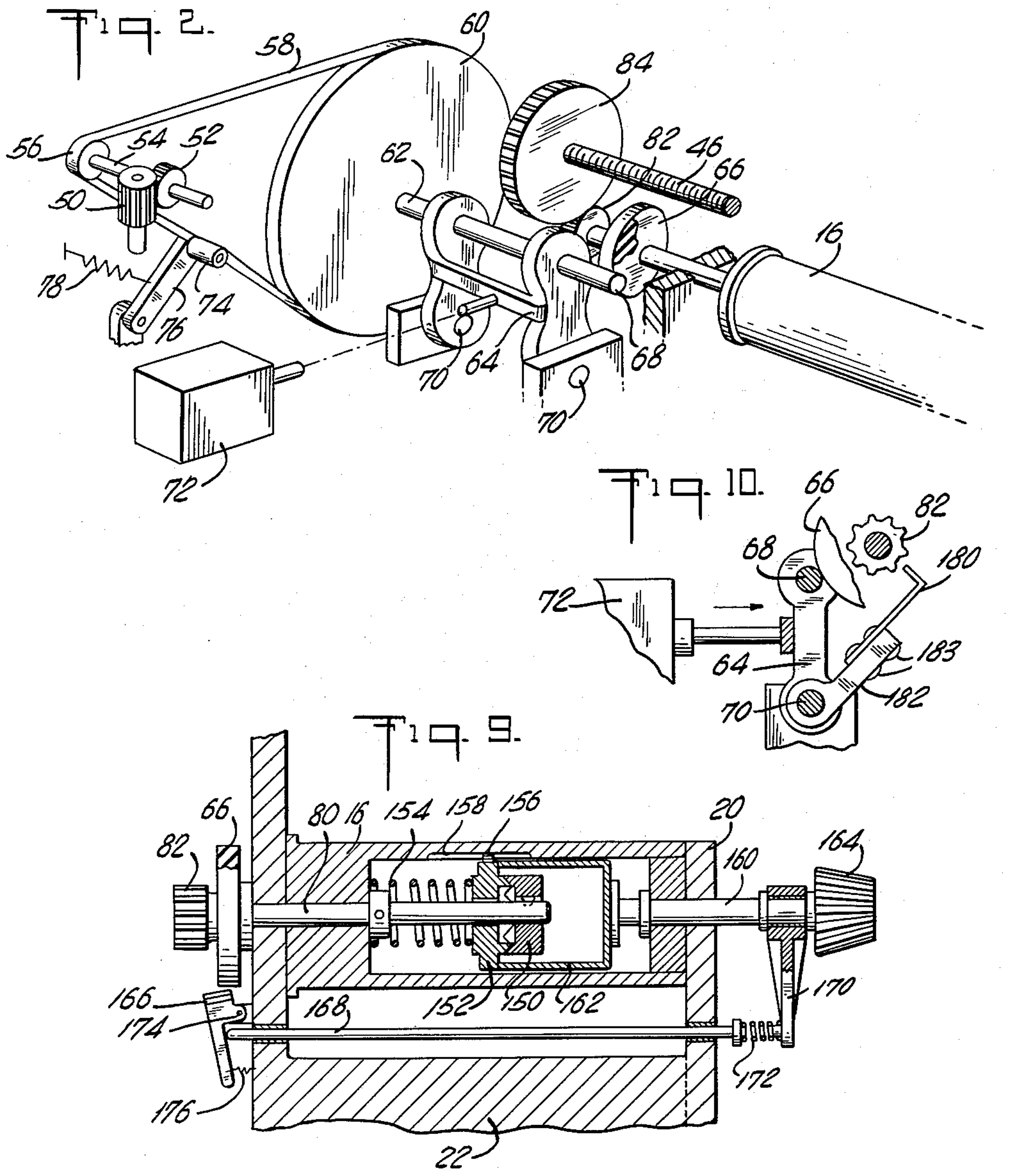
Figure 3:
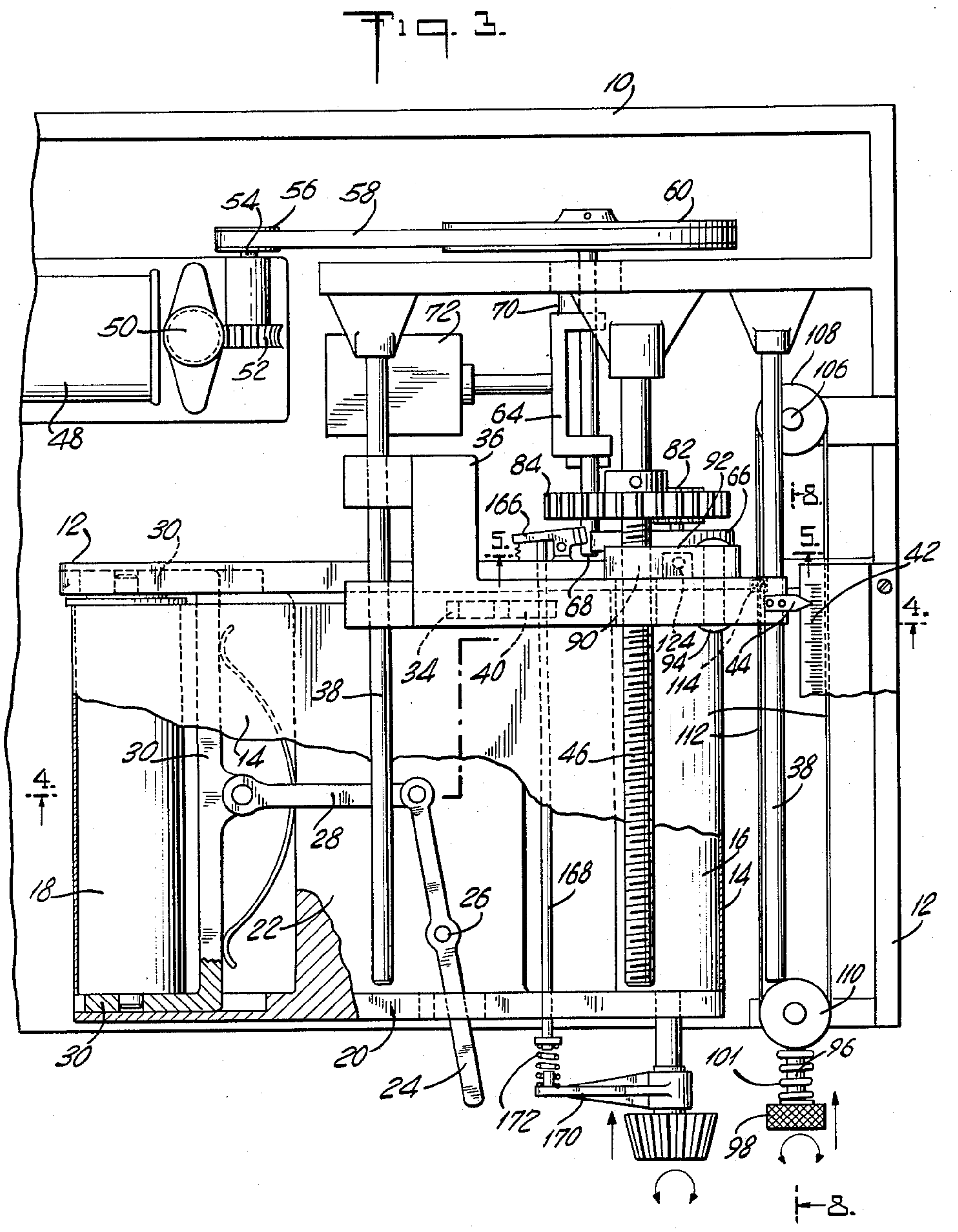
Figure 4:
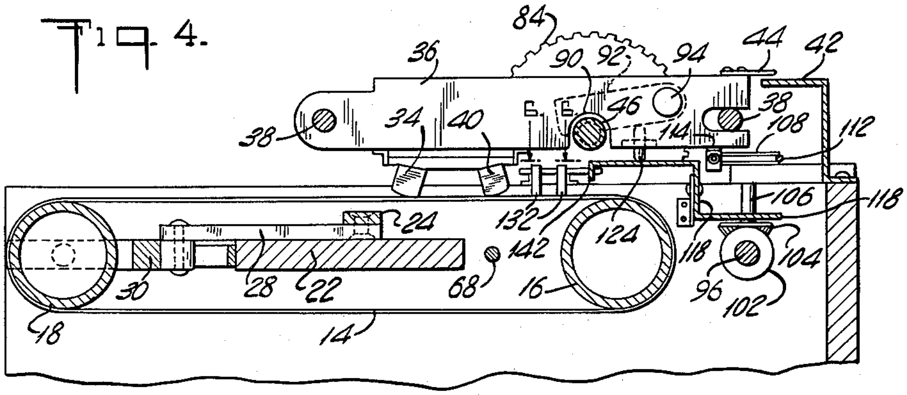
Figure 6:
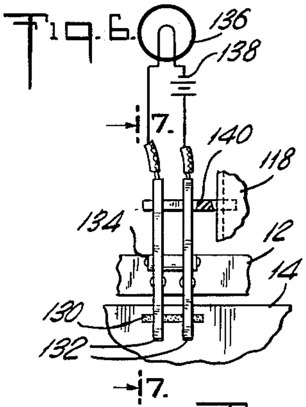
Figure 7:
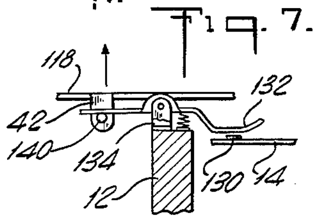
Figure 5:
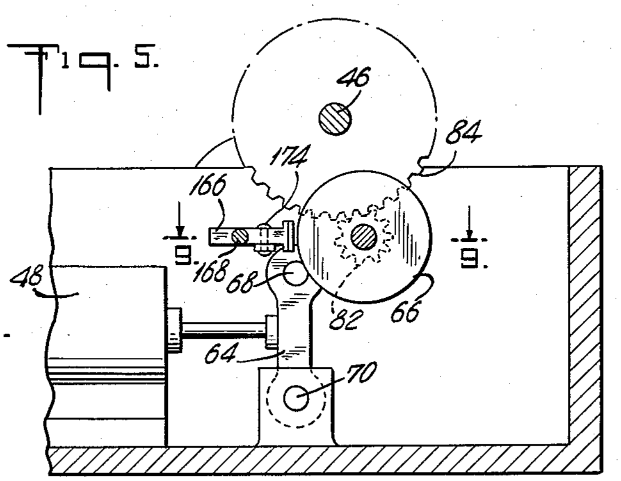
Figure 8:
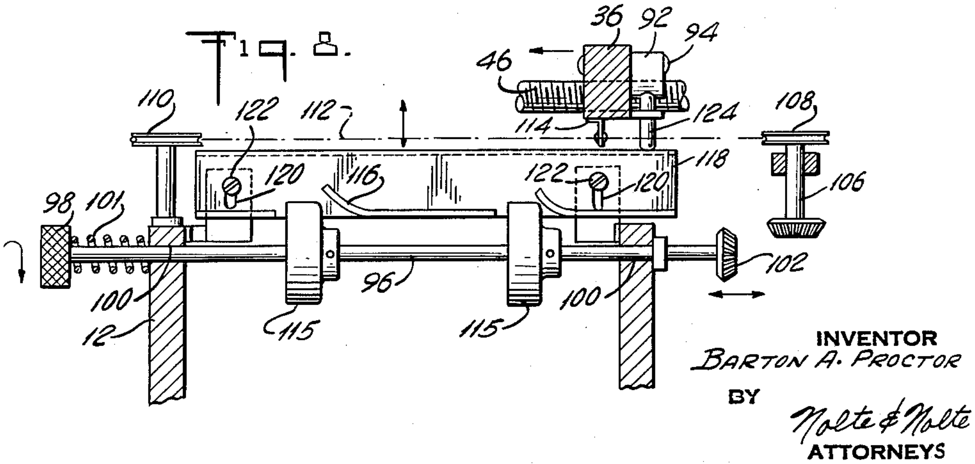
Figure 11:
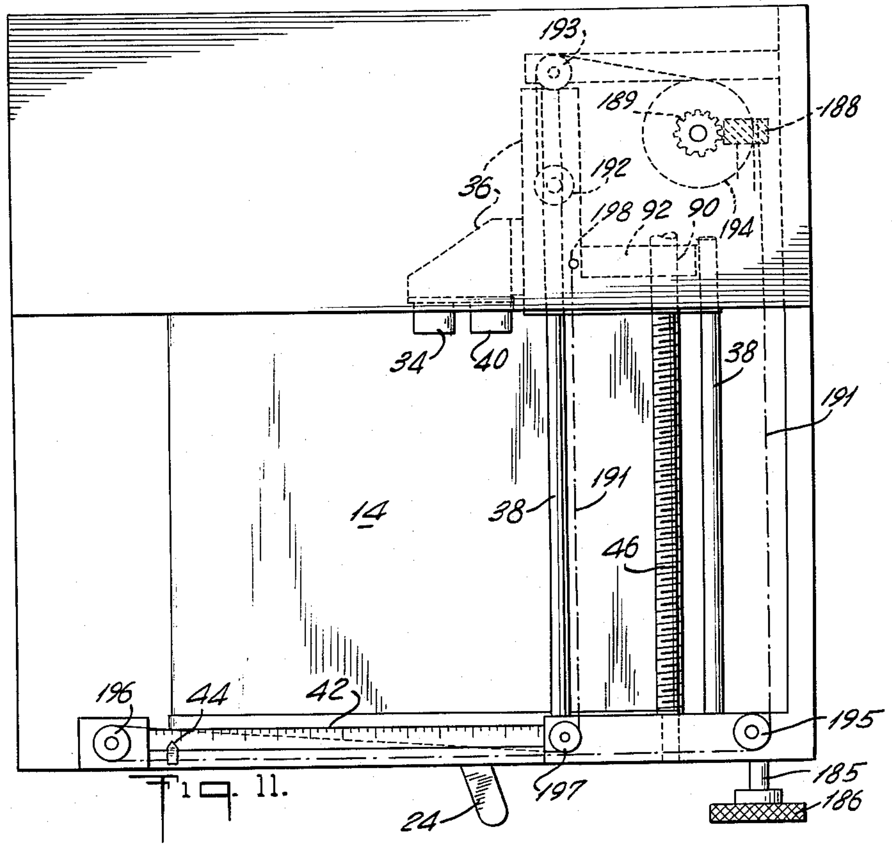
Figure 12:
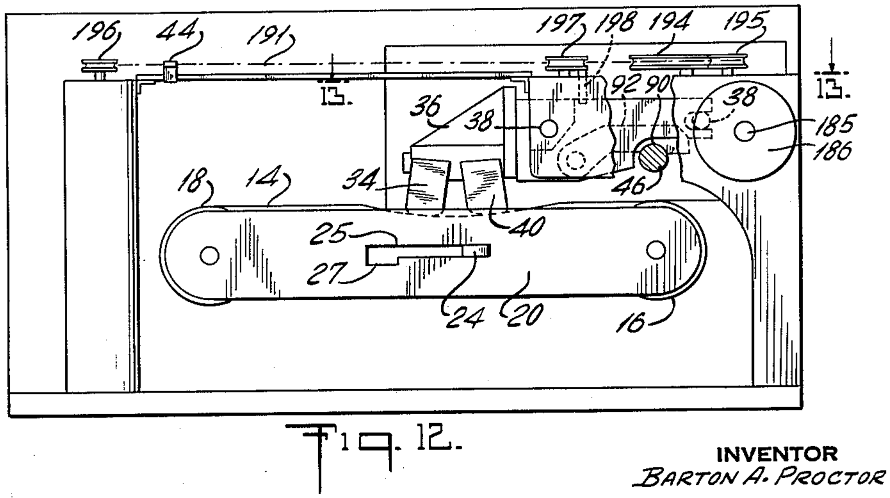
Figures 13, 17:
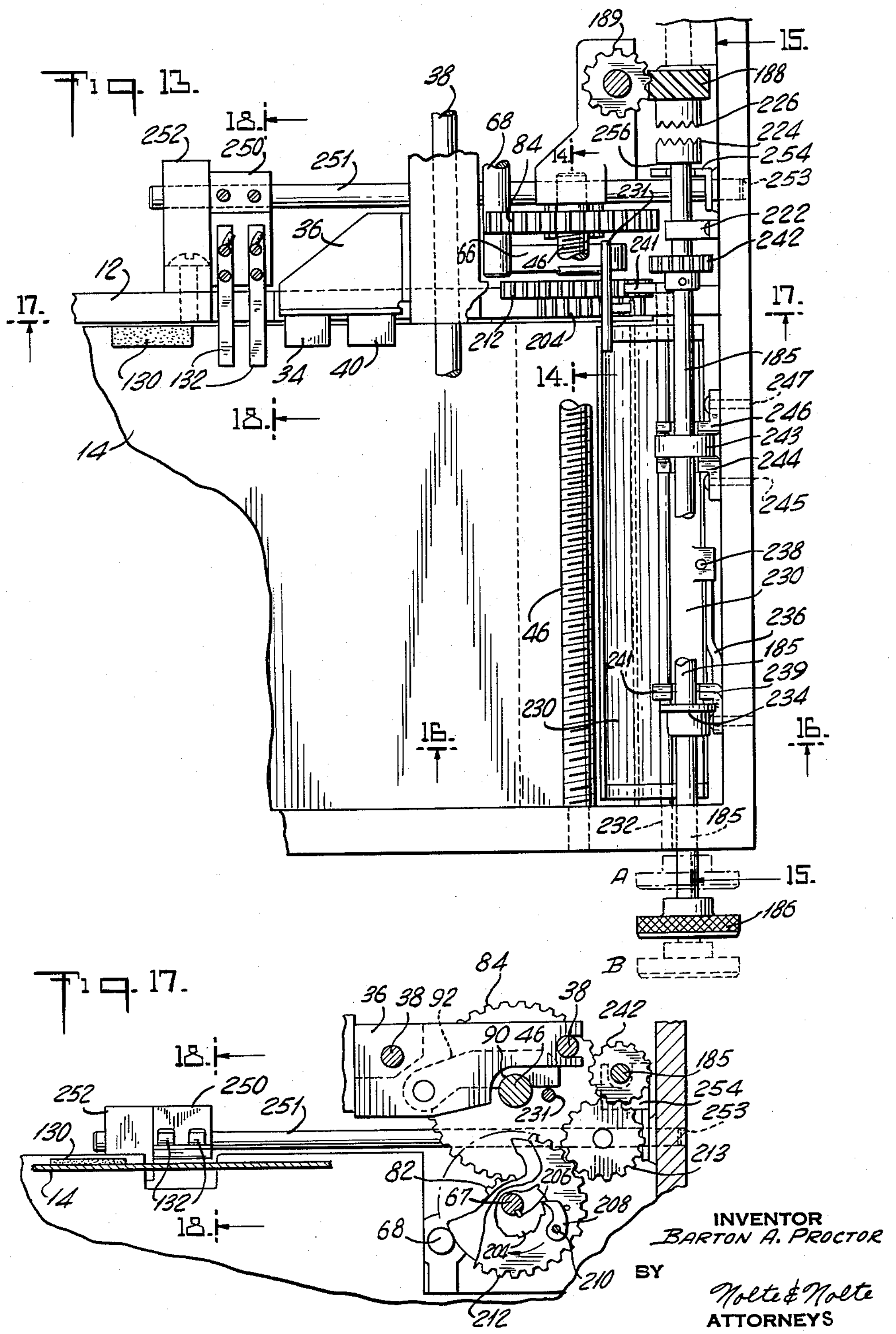
Figures 14, 15, 16, 18:
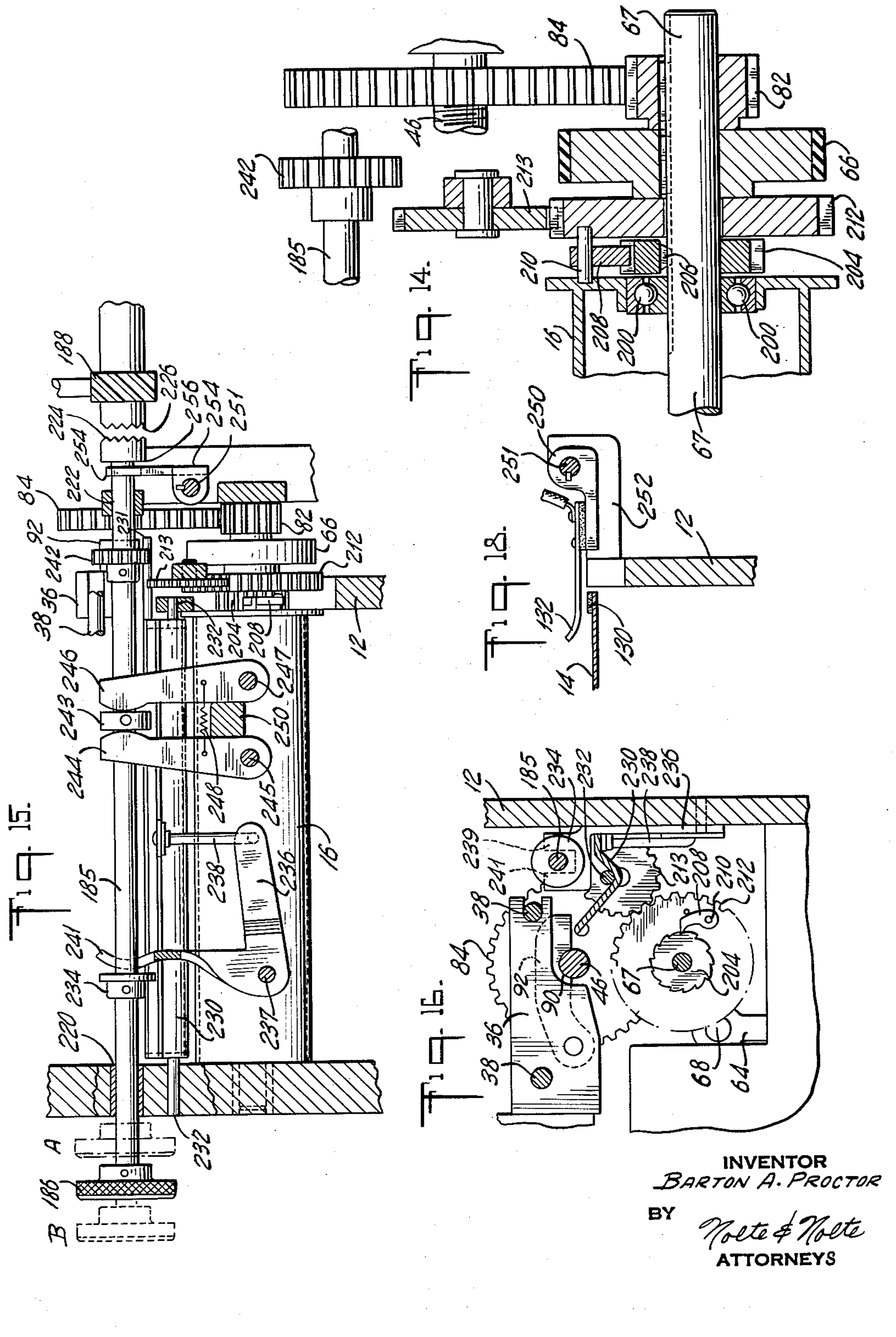

The drawings illustrate a preferred embodiment of the invention and include:

FIG. 1, a perspective view of a recording machine showing portions of the outside casing removed to disclose the general arrangement of the belt receiving means and the recording heads;

FIG. 2, a perspective view showing the arrangement of the belt drum drive and recording head drive;

FIG. 3, a plan view of the internal mechanism of the recording machine;

FIG. 4, a sectional view taken on the line 4—4 of FIG. 3 looking in the direction of the arrows;

FIG. 5, a sectional view of a detail of the drive mechanism taken along the line 5—5 of FIG. 3 looking in the direction of the arrows;

FIG. 6, a view taken along the line 6—6 of FIG. 4 looking in the direction of the arrows and illustrating a signal device;

FIG. 7, a detailed view taken along the line 7—7 of FIG. 6 looking in the direction of the arrows and showing the signaling device in its inoperative position;

FIG. 8, a view taken along the line 8—8 of FIG. 3 illustrating the means for adjusting the feed mechanism, and FIG. 9, a section taken along the line 9—9 of FIG. 5 showing the mechanism by which the rotation of the drum mechanism is adjusted to proper relationship with the recording head feed;

FIG. 10, which shows another type of braking mechanism for use with the invention;

FIG. 11, a top view of a second embodiment of the invention;

FIG. 12, a front view of the second embodiment of the invention;

FIG. 13, a view along the line 13—13 of FIG. 12 showing a top view of the operating mechanism;

FIG. 14, a sectional view showing the driving means for the belt;

FIG. 15, a view along the line 15—15 of FIG. 13 showing a front view of the operating mechanism;

FIG. 16, a view along the line 16—16 of FIG. 13 showing the carriage decoupling means;

FIG. 17, a view along the line 17—17 of FIG. 13 showing a detail of the driving mechanism, and FIG. 18, a view along the line 18—18 of FIG. 17 illustrating the brush adjusting mechanism.

Referring to the drawings and more particularly to FIG. 1, the machine is indicated as having two sections, the drive mechanism being enclosed in a housing 10 and the recording section being housed in an attached casing 12, partly broken away. Recording is done on a belt 14 which may be of material such as that used in tape recording. Belt 14 is slipped over a pair of rollers 16 and 18, roller 16 being the driving roller and 18 being primarily for stretching the belt 14. The outer end of rollers 16 and 18 is supported in a block 20 carried by a bracket 22 extending from the rear of the casing 12 to facilitate placing belt 14 about rollers 16 and 18. A retracting lever 24 is provided extending outwardly of block 20 through slot 25 for accessibility to the operator, and pivoted at 26 on bracket 22. The inner end is pivotally attached to a link 28, attached to a yoke 30 suitably coupled to the bearings of roller 18 so that roller 18 may be retracted against the force of the bow spring 32 which normally produces tension in belt 14. Slot 25 is provided with a downwardly extending notch 27 to lock lever 24 in the retracting position.

A suitable recording head 34 is mounted on a carriage 36 which is slidably mounted on guide rods 38 extending parallel to the axes of rollers 16 and 18. The recording head 34 is adapted to travel across belt 14, as the latter revolves, in a helical path and preferably without deformation of the surface of the belt. If desired, an erasing head 40 may also be provided as is customary in this general type of recorder. In order to indicate the position of recording head 34 with respect to the record, a suitable scale is provided as shown at 42. Indicator 44, carried by carriage 36, indicates such position. A suitable feed screw 46 is provided for transporting carriage 36.

The drive mechanism of drum 16 and feed screw 46 is shown in more detail in FIGS. 2 and 3. Power is supplied from a motor 48 having a worm 50 engaging worm wheel 52 on transverse shaft 54 carrying a pulley 56. A belt 58 couples pulley 56 to a large and preferably heavy pulley 60, which is adapted to act as a fly wheel. Pulley 60 is mounted on a transverse shaft 62 rotatably mounted in a pivoted yoke 64. For smoothness of drive, shaft 62 is coupled to a rubber surfaced drive wheel 66 at its smooth end 68. Inasmuch as the yoke 64 is pivoted at its lower end on pin 70, it is adapted to swing shaft 62 in and out of engagement with drive wheel 66 by means of a suitable solenoid 72. A suitable roller 74 mounted on a pivoted lever 76 biased by spring 78 is adapted to tension belt 58. Rubber drive wheel 66 is mounted on the main shaft 80 of drum 16 which also carries a spur gear 82 meshing with spur gear 84 on feed screw 46.

When it is desired to operate the machine, the operator presses a button to maintain solenoid 72 continually energized. The solenoid, pushing against yoke 64, urges the rotating capstan 68 against rubber drive wheel 66 to rotate drum 16. When the operator releases the button the solenoid is de-energized and the pressure of roller 74 against belt 58 causes capstan 68 to retract from drive wheel 66 to stop the rotation of drum 16.

The coupling between carriage 36 and feed screw 46 is shown most plainly in FIGS. 3 and 4. It is necessary to transport carriage 36 with respect to feed screw 46 to record information. For this purpose there is provided a half-nut 90 formed on an arm 92 pivoted at its opposite end on a pin 94 carried on carriage 36. When arm 92 is lifted to its disengaged position with respect to feed screw 46, carriage 36 is free to be moved lengthwise of feed screw 46 within the limits of its normal travel. Such means for manually releasing and moving carriage 36 is provided and controlled by a rod 96 having knurled head 98 and extending parallel to feed screw 46. Rod 96 is journalled in the casing 12 in suitable bearing holes 100. Rod 96 is provided with a bevel gear 102 adapted to engage a vertically disposed bevel gear 104 when rod 96 is pushed inwardly against the force of coil spring 101 biasing it in the other direction. Bevel gear 104 is mounted on a vertically disposed shaft 106 carrying a pulley 108 which with pulley 110 is adapted to guide a cord or belt 112 attached to carriage 36 by means of a clip 114. Disengagement of arm 92 is simultaneously produced by cams 115 spaced apart on rod 96 and adapted to engage tabs 116 which are formed in a longitudinally extending cam plate 118. Cam plate 118 is provided with slots 120 to permit sliding on suitable stationary pins 122. Thus, when pushed upwardly, cam 118 is adapted to push upwardly a pin 124 carried by carriage 36 to lift arm 92 in order to disengage half-nut 90 and screw 46. When half-nut 90 disengages screw 46, carriage 36 may be rapidly moved by rotating knurled head 98, since the driving bevel gears 102 and 104 are enmeshed.

It can be readily understood that there will be relatively little difficulty in recording by means of the head 34 suitably on belt 14. Difficulty, however, does arise when belt 14 has been removed and is replaced for reproduction purposes. There is no difficulty in returning the carriage 36 back to its original starting point, but when the belt 14 is replaced on guide rollers 16 and 18, one cannot ordinarily tell where the recording started on belt 14.

This invention provides a means for establishing a starting point on the surface of belt 14 as well as for the recorder 34. This purpose is accomplished in this instance by means which permits disconnection of the drive of rollers 16 and 18 from the drive screw 46 and to indicate by suitable signal a starting point on the information path. As shown in FIGS. 6 and 7, belt 14 is provided with a sensitized spot 130 as, for instance, a short length in the edge of belt 14 electrically conductive. Spot 130 is adapted to bridge a pair of electrical conductors such as brushes 132 pivotally mounted adjacent the edge of belt 14 on an insulated block 134 attached to frame 12. Brushes 132 are in the circuit of a signal lamp 136 and a voltage source 138. Normally, brushes 132 are held out of contact with spot 130 by an insulated rod 140 attached to an extension 142 of cam plate 118.

When head 98 is pushed inwardly, causing cam plate 118 to move in the direction of the arrow (FIG. 7), rod 140 causes brushes 132 to pivot about block 142 into a conductive relationship with spot 130. Thus the brushes only contact belt 14 when the operator desires to search for the information path, preventing wear of both brushes and belt.

Means is provided to uncouple drum 16 from the carriage which, as described above, is coupled to driving feed screw 46. As shown in FIG. 9, shaft 80 is provided with a clutch preferably of the crown type, one clutch member 150 being keyed to shaft 80, and the other clutch element 152, being slidable on shaft 80 against the force of a coil spring 154, which tends to keep the clutch elements in engagement. Clutch element 152 is provided with a key 156 slidable in a flute 158 formed within drum 16. Disengagement of clutch element 152 from clutch element 150 is accomplished by depression of a plunger 160 attached to a cup-shaped member 162 preferably welded to clutch member 152. At the outer end of 160 which extends through the end of drum 16 is provided a knurled knot 164 for manual turning of clutch member 152 and, consequently, drum 16.

It is necessary to brake rubber drive wheel 66 when plunger 160 is depressed, and to this end a friction dog 166 is mounted to engage wheel 66 when actuated by a rod 168 extending outwardly and in engagement with arm 170 rotatably mounted on plunger 160. Force is applied to rod 168 by arm 170 through a coil spring 172. Dog 166 which is pivoted at 174, is biased by a spring 176 to disengage wheel 66 when pressure is released at the knob 164.

To set the recording instrument in accordance with this invention, plunger 96 is pressed to release nut 90 and upon turning of the knob 98, carriage 36 is carried to its end inward position. Actuation of cam plate 118 simultaneously releases brushes 132 so that they bear on the edge of belt 14. Roller 16 is then declutched by brushing against the knob 164 and turning the drum 16 until spot 130 bridges the brushes 132 whereupon light 136 indicates a definite starting position. It will be noted that this staring position can be duplicated at any time.

In FIG. 10 another type of braking mechanism is illustrated which may be employed to inhibit the driving mechanism when it is desired to manually position the belt. As shown, solenoid 72 is energized to urge capstan 68 against rubber drive wheel 66. It is recalled that yoke 64 which supports capstan 68 is pivotally connected to the recorder frame by means of pins 70. The braking mechanism comprises hook lever 180 mounted on bar 182 by rivets 183. Bar 182 is rigidly coupled to yoke 64, so that when solenoid 72 is de-energized, and yoke 64 pulled to its normal position by the action of spring 78 (see FIG. 2), hooked lever 180 moves into engagement with the teeth of pinion 82, which is coupled to the drive shaft of drum 16, to prevent the drum and lead screw 46 from turning.

In FIGS. 11–18, there is shown an embodiment of the invention wherein it is necessary for the operator to manipulate only one knob to position the transducers over the desired path of the belt. In the following description identical reference numerals have been employed to designate the structural components, corresponding to those of FIGS. 1–9. In this embodiment carriage 36, including transducers 34 and 40, is also adapted to move via lead screw 46 across belt 14. Drums 16 and 18 are arranged to receive belt 14 in the manner above described.

Shaft 185, which is provided with a knurled head 186, accomplishes all the functions of shafts 96 and 160 illustrated in FIGS. 1 to 9. The end of shaft 185 opposite knob 186 is adapted to engage a helical gear 188 in a manner to be described below. As shown in FIGS. 11 and 13, gear 188 is positioned to engage a second helical gear 189 to cause rotation thereof when shaft 185 is manually rotated. To manually drive the carriage across the tape, a pulley system is provided comprising string 191 and pulleys 192 to 195 (FIG. 11). A large pulley 194 is rigidly connected to helical gear 189 so that it will rotate when shaft 185 is rotated. The pulley string 191 is looped around pulley 194, pulley 193 and tied to pulley 192. The other end of string 191 is looped around pulleys 195, 196 and 197, and attached to the carriage at point 198. The pulleys are pivotally mounted on the frame of the recorder so that when knob 186 is turned to rotate shaft 185, the pulley system drags the carriage transversely of the tape.

If desired, the indicating scale 42 may be placed on the front of the recording machine. Pointer 44 is positioned over the scale and tied to string 191 as shown. In this manner, as the carriage 36 is moved across belt 14, the pointer 44 is pulled along scale 42 by string 191 to indicate the relative position of the transducers with respect to the width of the belt.

Briefly recapitulating with respect to FIG. 2, it will be recalled that the energization of solenoid 72 is operative to initiate the rotation of rubber drive wheel 66 and shaft 67 to rotate the driving drum 16. Referring now to FIG. 14 there is shown a cross-sectional view of the particular driving means employed in the present embodiment. The rotation of rubber drive wheel 66 causes the rotation of shaft 67 as previously described. Drum 16 floats on shaft 67 by means of ball bearings 200. A ratchet wheel 204 is fixedly positioned by means of key 206 to the rotating shaft 67. A gear wheel 212 is positioned adjacent ratchet wheel 204 on shaft 67 on the side away from drum 16. An idler gear 213 is positioned in operative engagement with gear wheel 212 for reasons which will become more apparent below. A pawl 208 is pivotally connected by pin 210 to gear wheel 212 and drum 16. Referring now to FIGS. 14 and 17, pawl 208 is biased toward ratchet wheel 204 so that when shaft 67 rotates in the direction of the arrow, pawl 208 engages the teeth of the ratchet wheel causing drum 16 to also rotate in that direction.

Shaft 185 is slidably positioned in casing apertures 220 and 222. When the operator pushes head 186 inward, as shown in dotted lines at A, the toothed face 224 of the other end of shaft 185 engages a similarly toothed disc 226 which is rigidly coupled to helical gear 188 to permit manual rotation thereof. The rotation of the helical gears 188 and 189 causes carriage 36 to move across tape 14 as above described. However, it will be recalled that before the carriage can move, it is necessary to disengage the carriage half-nut 90 from lead screw 46. In the present embodiment, this is accomplished by the use of V-shaped cam plate 230 (see FIG. 16) which may be caused to pivot about pins 232 extending into the recorder frame, to raise half-nut 90 when head 186 is pushed inwardly.

As shown in FIGS. 13 and 15, shaft 185 is provided with a circular projection 234 which will contact a forked bell crank 236 when the shaft is moved in an inward direction. Bell crank 236 is pivotally connected to the machine frame by pin 237 with prongs 239 and 241 positioned around shaft 185. A vertical rod 238 is fixed to the other end of bell crank 236 and to V-shaped cam plate 230. Thus, when knob 186 is pushed inwardly of the recorder frame 12 to position A, projection 234 urges the forked end of bell crank 236 in the same direction. This action causes the bell crank to pivot about pivot 237 forcing the bell crank to rotate in a clockwise direction. This motion is coupled by means of rod 238 to cam plate 230. The downward force exerted by rod 238 on the cam plate causes it to rotate about pivots 232 in a clockwise direction. As the cam plate rotates clockwise its left side contacts half-nut 90 and moves it out of engagement with lead screw 46. The carriage is then free to move transversely across belt 14, as above-described, by the rotation of helical gears 188 and 189. When the carriage is at the starting position (towards the rear of the machine), half-nut 90 is situated beyond cam plate 230. Thus, cam plate 230 is provided with a rearwardly extending arm 231, so that half-nut 90 may be raised when it is not adjacent the cam plate itself.

When the carriage has been moved to the edge of the belt, the head 186 may then be pulled outwardly from frame 12 to the position shown in dotted lines at B, whereby the drum 16 may be rotated until the electrically conductive spot 130 contacts brushes 132 in a manner identical to that described above with reference to FIGS. 6 and 7. To manually rotate drum 16, a spur gear 242 is fixed to shaft 185. It will be recalled that circular gear 212, attached to drum 16 by means of pin 210, meshes with idler gear 213. Under normal conditions circular gear 212 and idler gear 213 rotate freely, but when the head 186 is pulled out to position B, spur gear 242 engages idler gear 213. Under these conditions, if shaft 185 is manually rotated in a clockwise direction, gear 242 will drive gear 212 through idler gear 213, causing drum 16 to rotate to position electrically conductive spot 130 under brushes 132.

As in the previous embodiment, when it is desired to manually rotate belt 14, driving shaft 67 is inhibited by braking means from further rotation. Ratchet wheel 204, which is keyed to shaft 67, is thus also held stationary, and when shaft 185 is rotated in a clockwise direction, pawl 208 moves freely over the teeth of the ratchet wheel.

It will be recalled that it is desirable to hold the brushes 132 away from the surface of the belt except when searching for the conductive spot 130. In this embodiment, the brushes 132 are mounted on a plate 250 which is keyed to a rotatable shaft 251 as shown in FIGS. 13 and 18. Shaft 251 is perpendicular to the control shaft 185 and adapted to rotate in bearings 252 and 253 in the frame of the recorder. The end of shaft 251 closest to the shaft 185 is rigidly connected to a rocker plate 254 having two arms which straddle the shaft 185 in close proximity to the rear shoulder 256 of toothed face 224. When head 186 is pulled away from the recorder frame to position B as shown in FIGS. 13 and 15, rear shoulder 256 contacts rocker plate 254 causing the plate to rotate in a counterclockwise direction. The shaft 251 which is fixed to the plate 254 also rotates causing plate 250 to rotate in a counterclockwise direction so that brushes 132 move into operative engagement with the belt 14 to search for the spot 130.

To maintain shaft 185 in its center position, shaft 185 is provided with knob 243 which is positioned between vertical centering levers 244 and 246 (FIG. 15). Levers 244 and 246 are pivotally connected by pins 245 and 247, respectively, to the frame of the machine. A coil spring 248 biases the two levers toward each other, and against stop 250, to maintain shaft 185 in the desired center position. As illustrated in solid lines in FIG. 15, the shaft 185 is in its center position. When the shaft is pushed inwardly to position A, centering lever 246 is caused to rotate about pivot 247 by knob 243. Centering lever 244, on the other hand, is prevented from movement by stop 250, and as a result coil spring 248 is tensioned. Consequently, when the operator releases shaft 185, spring 248 urges centering lever 246 back to its illustrated center position, and lever 246, pushing against knob 243, forces the shaft 185 to its center position. In a similar manner, when the knob 186 is pulled away from the frame to position B, lever 244 pivots, while lever 246 remains stationary against stop 250. Coil spring 248 biasing the two levers toward each other, again pulls the shaft 185 to its center position when the operator releases knob 186.

In this embodiment, because of physical limitations, it is advantageous to use a type of braking mechanism as illustrated in FIG. 10, although other braking means may be used within the scope of the invention.

Although specific embodiments of the invention have been shown, it is not my intention to be limited except as defined in the following claims.

What is claimed is:

1. A tape recording machine comprising means to support and to rotate a record receiving belt, transducer means for recording signals on said belt and reproducing them therefrom, a feed mechanism to transport said transducer means across said belt, means to couple said rotating means and said feed mechanism in a fixed relationship in order to record information on said belt in a predetermined path, means enabling manual position of said transducer means across said belt free of said coupling means, and electrical signal means for indicating to an operator of said machine when said transducer means have been manually positioned on said path.

2. The recording machine according to claim 1, wherein said indicating means includes an electrically conductive portion on said belt and an electrical signal device cooperative therewith.

3. The recording machine according to claim 2, wherein said manual positioning means includes means for decoupling said rotating means and said feed mechanism, means for moving said transducer means and additional means for rotating said belt.

4. The recording machine according to claim 3, wherein said moving means and said additional rotating means include a shaft movable with respect to the frame of the machine, said shaft being rotatable in one position to move said transducer means and being rotatable in another position to rotate said belt.

5. The recording machine according to claim 2, wherein said electrical signal device includes brush means adapted to contact said portion, and wherein there is further provided means for holding said brush means out of contact with said belt except when said positioning means are operative.

6. A recording machine for recording information on an endless belt mounted on two rotatable drum members, comprising first drive means for rotating said belt, a lead screw, a carriage having transducer means supported thereon, means coupling said carriage and said lead screw, means for rotating said screw whereby said carriage is caused to move transversely of said belt so that said transducers trace a helical path on said belt, and means for accurately positioning said transducer means on said path, said positioning means including means for decoupling said carriage and said lead screw, means enabling manual positioning of said transducers relative to said belt, second drive means for rotating said belt, and electrical signal means for indicating to an operator of said machine when said path is directly adjacent said transducers.

7. The recording machine according to claim 6 wherein said indicating means includes an electrically conductive area on said belt, brush means positioned in close proximity to said belt, and an indicating circuit connected to said brush means whereby an indication is given when said brush means contacts said area.

8. The recording machine according to claim 7, wherein the means enabling manual positioning of said carriage comprises normally inoperative additional drive means for moving said carriage transversely of said belt and a slidable shaft having means for engaging said additional drive means when said shaft is moved from its normal position to a second position, whereby said shaft may be rotated to move said carriage.

9. The recording machine according to claim 8, wherein said decoupling means includes cam means actuable by said shaft when said shaft engages said additional drive means.

10. The recording machine according to claim 9 including means for preventing said brushes from contacting said belt except when said additional drive means are operable to position said carriage.

11. The recording machine according to claim 10, wherein said first drive means includes means for rotating one of said drums, and wherein said second drive means includes a second shaft coupled to said one drum, said second shaft being fixed to said one drum and being slidably operable to disengage said drum rotating means and said one drum, whereby said second shaft may be rotated to rotatably position said belt, and means for braking said drum rotating means when said drum rotating means is disengaged from said drum.

12. A recording machine according to claim 10, wherein said first drive means includes means for rotating one of said drums, and wherein said second drive means includes means fixedly positioned to said shaft for engaging said one drum when said shaft is moved to a third position, whereby said shaft may be rotated to rotate said belt.

13. The recording machine according to claim 10, wherein said first drive means includes a ratchet wheel, means for rotating said ratchet wheel, a first gear, and a pawl pivotally coupled to one of said drums and said first gear and operable to cause rotation thereof when said ratchet wheel rotates in one direction, and wherein said second drive means includes a second gear fixed to said one drum for rotation therewith, and means fixedly attached to said shaft for engaging said second gear when said shaft is moved to a third position, whereby said shaft may be rotated to rotatably position said shaft, and means for braking said ratchet rotating means when said shaft is moved to said third position.

References Cited by the Examiner

UNITED STATES PATENTS

| | | | |
|---|---|---|---|
| 2,865,637 | 12/1958 | Roberts et al. | 274—42 |
| 2,883,476 | 4/1959 | Dermond et al. | 179—100.2 |
| 2,908,767 | 10/1959 | Fritzinger | 179—100.2 |
| 2,990,184 | 6/1961 | Stanton | 274—4 |
| 3,039,777 | 6/1962 | Trost | 274—20 |

NORTON ANSHER, *Primary Examiner.*

BERNARD KONICK, *Examiner.*